[15] 3,639,276
Mueller [45] Feb. 1, 1972

[54] CORROSION-INHIBITING THERMAL INSULATION FOR STAINLESS STEEL

[72] Inventor: Arthur P. Mueller, Cincinnati, Ohio
[73] Assignee: Panacon Corporation, Cincinnati, Ohio
[22] Filed: Nov. 4, 1970
[21] Appl. No.: 86,970

Related U.S. Application Data

[63] Continuation-in-part of Ser. No. 846,591, July 31, 1969, abandoned.

[52] U.S. Cl.................252/62, 106/286, 161/170, 161/193, 161/205, 260/29.7 P, 260/29.7 R
[51] Int. Cl.............C04b 43/04, C04b 35/16, C04b 43/02
[58] Field of Search............252/62; 106/286; 260/29.7 S, 260/29.7 P, 29.7 R; 161/170, 205, 193

[56] References Cited

UNITED STATES PATENTS

| | | | |
|---|---|---|---|
| 2,625,512 | 1/1953 | Powell | 252/62 |
| 2,903,409 | 9/1959 | Morse | 252/62 X |
| 3,043,790 | 7/1962 | Sanders | 260/29.7 |
| 3,103,254 | 9/1963 | Stedman | 181/33 |
| 3,169,927 | 2/1965 | Matsch | 252/62 |
| 3,244,632 | 4/1966 | Schulz et al. | 252/62 |
| 3,383,230 | 5/1968 | Streib et al. | 106/286 |
| 3,450,547 | 6/1969 | Sams et al. | 252/62 X |
| 3,522,067 | 7/1970 | MacArthur | 252/62 X |
| 3,523,085 | 8/1970 | Shannon | 252/62 |

*Primary Examiner*—Harold Ansher
*Attorney*—Melville, Strasser, Foster & Hoffman

[57] ABSTRACT

Molded thermal insulation material for use in contact with austenitic stainless steel chemical-processing equipment, to inhibit stress corrosion cracking thereof, consists of at least 60 percent by weight of cellular expanded perlite, bonded by a dried, inorganic, water soluble binder. The binder consists of a major proportion of a mixture of sodium silicate and potassium silicate and a minor proportion of sodium hexametaphosphate, and the molecular ratio of the silica to the alkaline oxide is at least 3.6 to 1.0. The potassium silicate consists of at least about 40 percent, by dry weight, of the total silicate in the dried binder, and the total binder constitutes at least about 20 percent, by weight, of the total insulation composition. In the manufacture of the molded insulation, the mixture of perlite and the binder, in slightly damp condition, is placed in the mold cavity and subjected to light molding pressure, sufficient to compact the material into the exact configuration of the mold cavity without expelling water from the mixture. The molded insulation is removed from the mold and oven dried at a temperature of about 250° F.

13 Claims, No Drawings

CORROSION-INHIBITING THERMAL INSULATION FOR STAINLESS STEEL

CROSS-REFERENCE TO RELATED APPLICATION

This application is a continuation-in-part of a copending application, Ser. No. 846,591, filed July 31, 1969, now abandoned.

SUMMARY OF THE INVENTION

This invention relates to a molded thermal insulation material generally suitable for use in insulating heated industrial processing equipment, including petroleum-cracking towers, stills, chemical reaction vessels, boilers, storage tanks and piping having surface temperatures as high as 1,300° F. The molded insulation may be in the form of blocks or slabs, or hemicylindrical pipe covering sections.

Austenitic stainless steels are used extensively for the fabrication of processing equipment in the petroleum, chemical, and soap and detergent industries because of their excellent resistance to chemical attack. Austenitic stainless steel is defined as a chromium-iron alloy to which sufficient nickel has been added to retain the austenitic phase (solid solution of the alloying elements in face-centered cubic iron). A typical analysis of one type of such stainless steel shows 17% chromium, 12% nickel and 2.5% molybdenum.

However, austenitic stainless steel has one serious weakness, in that it is subject to stress corrosion cracking under certain conditions; and this has caused many equipment failures with resultant high cost for equipment repairs or replacement, and for loss of process production. It has been well established that the conditions which tend to induce stress corrosion cracking are: (1) the presence of stress in the metal, (2) the presence of moisture on the metal surface, (3) the presence of chlorides in solution, and (4) a temperature range generally of 50° to 200° C. (122° to 392° F.)*. Dana, Stress Corrosion Cracking of Insulated Austenitic Stainless Steel. *ASTM Bulletin*, Oct. 1957 ASTM STP No. 264, Stress Corrosion Cracking of Austenitic Chromium-Nickel Stainless Steels, 1960 Ashbaugh, External Stress Corrosion Cracking of Stainless Steel Under Thermal Insulation, *Materials Protection*, May 1965.

Thus, thermal insulation systems when installed on stainless steel surfaces exposed to environments containing both chlorides and moisture may act as collecting media, transmigrating and concentrating chlorides on the heated metal surface, thereby inducing stress corrosion cracking.

This invention affords protection against stress corrosion which has two phases: first, the insulation itself is inhibited against the corrosion-inducing effect of any trace amount of chloride ion which may be present therein as a contaminant of the materials of its composition. Beyond that, the binder used provides a continuing inhibiting effect, after the insulation has been installed upon a stainless steel surface, that prevents the stress-corrosion-inducing effects of any concentration of chloride ions from environmental sources which may gain access to the stainless steel, as from a marine atmosphere, or from chloride-containing chemicals used in the plant processes.

With the foregoing considerations in mind, it is the principal object of this invention to provide a molded thermal insulation, composed predominantly of finely divided, cellular expanded perlite, bonded into monolithic form of precise dimensions by an inorganic, water-soluble binder. This binder is of such composition that the molded insulation is not only self-inhibited, but further, makes available to the surface of the stainless steel with which the insulation is in contact, an inhibiting film of soluble silicate-phosphate that prevents the stress corrosion-inducing action of chloride ion from occurring, by transmigration when moisture is present. This new corrosion-inhibiting insulation may of course also be installed on heated metal surfaces other than austenitic stainless steel with satisfactory results.

The composition of the binder material which is effective to produce these highly desirable results consists chiefly of water soluble alkali silicate (a mixture of potassium and sodium), with a minor proportion of water soluble phosphate. This three-component binder imparts to the molded perlite insulation improved properties in certain respects, that are not obtainable with any single component, but only with the composite mixture in the range of proportions herein disclosed. Although the binder solution is a mixture, in terms of its effective bonding action in the molded perlite insulation, it must be regarded as a single binder material, specifically a phosphate-modified soluble alkali silicate, which becomes substantially insoluble upon simple drying of the molded perlite and binder composition.

A further object of this invention is to produce from cellular expanded perlite and the soluble alkali silicate-phosphate binder a precision-molded thermal insulation by a simple, direct molding process. The method involves pressure compaction of a loose mixture of the expanded perlite and a minor proportion of a selected inorganic fiber, previously moistened with a predetermined amount of the alkali silicate-phosphate solution, without expulsion of water from the mold, followed by merely drying the molded piece. When the new insulation is thus produced it is found that the finished, dried, molded product has substantially the exact shape and dimensions of the mold cavity in which it was formed. The shrinkage and warpage of the molded product during drying are negligible, therefore the insulation need not be molded oversize, and can be used without requiring any machining to specified finished dimensions and provides an exact fit for the piping or other surface on which it is to be installed. It is a special advantage of the process that no ceramic firing or high-temperature furnace treatment of the molded product is needed to render the binder effective, since this is accomplished by simply evaporating the water content at relatively low temperature.

Further objects of this invention are to provide a molded thermal insulation for the temperature range up to 1,300° F., that is hard, strong, and resistant to mechanical abrasion stresses; that is of low density and has high-thermal-insulation efficiency; that is resistant to deterioration and structural disintegration by absorbed water, even at steam temperatures; and that can be produced at a low cost.

It is a special advantage of this alkali silicate-phosphate binder composition that it is entirely inorganic, and thus the perlite-binder combination is not appreciably affected in strength by deterioration in the temperature range from 250°–400° F., in which range organic binders are largely destroyed and lose most of their bonding strength.

Expanded perlite has previously been used in the manufacture of preformed (molded) thermal insulations for industrial use on surfaces in the general temperature range for which the product of the present invention is suitable. In particular, reference is made to U.S. Pat. No. 2,884,380, issued Apr. 28, 1959 to Cook, Fleming and Heilman, the patented product having cellular expanded perlite as its major ingredient, with a composite binder. The primary binder is the inorganic mineral, Bentonite Clay, and the secondary binder is an organic material selected from the group: emulsified asphalt, polyvinyl acetate, polyvinyl alcohol, acrylic polymers, starch and carboxymethyl cellulose.

Reference also is made to U.S. Pat. No. 3,408,316, issued Oct. 29, 1968 to Mueller and Asher, which also relates to a perlite insulation made with a composite mineral-organic binder. The mineral is Bentonite Clay and the organic binder includes a low- and stable-viscosity modified starch and a phenol-formaldehyde thermosetting resin. This patent also gives detailed information regarding the chemical and physical characteristics of raw perlite, deposits of perlite ore of suitable quality in the United States, pulverization of raw perlite to proper sieve analysis before expanding treatment, conditions of the expanding process, and the physical characteristics of expanded perlite.

The perlite insulation products of the above-reference patents have no corrosion-inhibiting effect when installed on a stainless steel surface. All thermal insulating materials contain soluble chlorides in varying amounts, up to 1,000 parts per million, and these patented perlite insulations may contain trace amounts of chlorides, generally in the range of 50 to 170 p.p.m. (parts per million). Further, neither the expanded perlite nor any of the binder materials disclosed in these patents has a specific corrosion-inhibiting effect when an excessive concentration of soluble chloride is present on the stainless steel surface.

DETAILED DESCRIPTION OF THE INVENTION

This invention will be described by presenting two typical compositions, one of which (I) contains asbestos fiber and the other (II) contains no asbestos fiber, but does contain as a fibrous reinforcement a small amount of fine glass fiber in the form of chopped, spun glass roving. The various criteria used in the selection of the ingredients, the method of preparing the binder solution, the manner of mixing the composition and the molding of the end product are described in detail. Thereafter the preferred ranges of compositions, both with and without asbestos, and broad ranges satisfactory for certain purposes will also be set forth. Finally, some test results of the typical examples will be stated.

Generally, it has been found desirable, and in some cases essential, to include in the molded perlite insulation a small amount, up to about 10 percent by weight of a heat-resistant inorganic fiber such as asbestos or fine fiber glass. Asbestos fiber helps to prevent edge cracking of the molded perlite piece during drying and fine glass fibers have a similar effect. Fine glass fibers, such as chopped spun roving, add toughness to the molded insulation and provide a mechanical reinforcement that tends to prevent the breaking apart of a piece that has become cracked or otherwise damaged in handling. In some cases it may be desirable to produce the new perlite insulation as units of relatively small dimensions (insulating bricks) for special conditions of installation and where such small pieces are to be produced the inorganic fiber may be omitted.

TYPICAL EXAMPLE I—COMPOSITION CONTAINING ASBESTOS

As a typical example of the practice of this invention, a molded thermal insulation has been produced having the following composition:

| | Percent solids, Dry weight basis |
|---|---|
| Expanded perlite, bulk density 2.3 lb./cu. ft. | 67.8 |
| Soidum silicate, silica/soda weight Ratio: 3.75/1.0 | 10.3 |
| Potassium silicate, silica/potash Weight ratio: 2.5/1.0 | 10.3 |
| Sodium Hexametaphosphate, (NaPO₃)6 | 4.1 |
| Short amosite asbestos fiber (7W grade) | 4.4 |
| Styrene-butadiene polymer latex (Naugatex 2752) | 3.1 |
| Total | 100.0 |

CRITERIA WITH RESPECT TO THE INGREDIENTS

For the manufacture of the new thermal insulation, an expanded cellular perlite of very low-bulk (loose fill) density, in the range of 1.8 to 3.5 pounds per cubic foot is used. The best combination of properties of the finished molded insulation is obtained when the bulk density of the expanded perlite is in the range of 2.0 to 2.5 pounds per cubic foot. The bulk density can be maintained within this desired range by controlling the sieve analysis of the pulverized raw perlite ore and the temperature and rate of heating of the perlite particles in the expansion process.

Expanded perlite within the limits of the following specifications for sieve analysis has been found entirely suitable for the manufacture of the new insulation.

| | Percent retained by volume | |
|---|---|---|
| ASTM standard sieve No. | Min. | Max. |
| 20 | 3 | 10 |
| 30 | 15 | 30 |
| 50 | 45 | 60 |
| 100 | 2 | 5 |
| Passing No. 100 sieve | 5 | 15 |

Thus, the expanded perlite used is characterized by particle size grading such that from 60 percent to 90 percent by volume passes the No. 20 test sieve and is retained on the No. 50 test sieve.

In the composition of the silicate-phosphate binder solution it has been found that it is necessary to use alkali silicates having a high-molecular ratio of silica to alkali oxides. This ratio should be at least 3.6 to 1.0. If the alkali content is greater than this, it exerts too much fluxing action on the perlite particles and causes fusion and failure of the molded insulation at temperatures much below the designed 1,300° F. service limit. Also, the higher-alkali-content binder remains quite soluble after drying and the water resistance of the insulation is greatly reduced. The composition of a typical example, above set forth, used a commercial sodium silicate solution having a weight ratio of $SiO_2/Na_2O$ of 3.75 (molecular ratio 3.88). The potassium silicate used had a weight ratio of 2.50 for $SiO_2/K_2O$ and a molecular ratio of 3.92.

The water-soluble phosphate which is used in the composite binder solution is preferably sodium hexametaphosphate, $(NaPO_3)6$ another phosphate which gives equivalent results is the so-called "glassy phosphate," a structurally similar polyphosphate which has up to 21 phosphorus atoms per mole. Other soluble phosphates such as sodium pyrophosphate, and phosphoric acid, give unsatisfactory results.

Confirming the advantages of the composite soluble silicate-phosphate binder disclosed herein, it was found that when sodium silicate was used alone as the binder for the perlite insulation the molded pieces showed warping and cracking when dried, and the insulation did not meet the soaking heat test at 1,200° F. because the perlite fused at a temperature of about 1,100° F. Perlite insulation bonded with a mixture of sodium and potassium silicates also showed warping and cracking and was not serviceable at 1,200° F. The combination of the two alkali silicates plus sodium hexametaphosphate, in the proportions disclosed herein, used as the perlite binder, produced an insulation that was free from warping and cracking had very low shrinkage at 1,200° F. with no tendency to fusion, and was serviceable up to 1,300° F.

The short asbestos fiber in the composition serves a special purpose, that of preventing edge cracking of the molded perlite piece during drying. Long asbestos fiber if included in the composition has been found objectionable because of its tendency to cause balling of the moistened perlite mixture, so that it does not compact uniformly in the mold, thus making the molded insulation weak. An extremely short fiber grade such as Canadian Grade 7 does not have this objectionable effect, and does prevent edge cracking and makes the molded insulation somewhat less brittle.

Any short fiber grade in the 7 Group of the Canadian (Quebec Asbestos Manufacturers' Association i.e., Q.A.M.A.) Standard Classification may be used. Generally the shortest grades, 7T or 7W, will be selected because of their low cost and easy workability in the perlite insulation mixture. Another kind of short asbestos fiber that gives exceptionally good results is short Amosite asbestos of fiber length equivalent to that of the Canadian 7 grading While the binder composition for the expanded perlite is completely inorganic it may be desirable to include in the composition a very small amount, in the range of 3 to 5 percent by weight, of an organic material as a plasticizer for the molded insulation. For this purpose a synthetic rubberlike latex dispersion such as styrene-butadiene polymer latex is suitable, and various other rubberlike polymer dispersions may be used. This very small amount of organic plasticizer makes the dried molded perlite insulation less brittle, and more resistant to the disintegrating effects of abrasion stresses, as in the tumble test. While the new perlite insulation can be made completely from mineral and inorganic materials, the preferred compositions with asbestos fiber (typical composition I) contain at least about 3 percent by weight of such an organic plasticizer. The compositions in which chopped spun glass roving is used instead of asbestos fiber do not require any organic plasticizer, as in the formula of typical composition II.

TYPICAL EXAMPLE II–COMPOSITION CONTAINING FINE GLASS FIBER

As a second example of the practice of this invention, using a perlite composition containing chopped spun glass roving as the inorganic fiber, a molded thermal insulation was produced having the following compositions:

|   | Percent solids, Dry weight basis |   |
|---|---|---|
| Expanded perlite, bulk density 2.3 lb./cu. ft | 67.5 | |
| Sodium silicate, silica/soda weight ratio: 3.75/1.0 | 11.0 | |
| POtassium silicate, silica/potash weight ratio: 2.5/1.0 | 11.0 | |
| Sodium hexametaphosphate (NaPO₃)6 | 4.5 | |
| Chopped spun glass roving: ½" length | 4.0 | 6.0% |
| ¼" length | 2.0 | |
| Total | 100.0 | |

It will be noted that this composition contains no asbestos and no organic plasticizer material and is 100-percent inorganic.

When fine glass fibers are included the composition as a heat-resistant, inorganic reinforcement for the molded perlite insulation, chopped spun glass roving is selected as the most suitable form of glass fiber for this purpose. The individual fibers of the roving are of very small diameter, in the range of about 0.00036 to about 0.00039 inches, and have been spun together into a roving and then chopped to a specified length. It has been found advantageous to use a mixture of fiber lengths, generally in the range of ¼ to ½-inch length. Some chopped roving as short as one-eighth inch may be included, but it is less effective as mechanical reinforcement than fibers the ¼ to ½-inch range. Some longer fibers, up to 1 inch in length, may also be included, but fibers longer than one-half inch are more difficult to mix uniformly with the perlite and binder and they tend to ball up and cause the mixture to compact unevenly so that the product is less uniform in density and strength.

HEALTH HAZARDS OF ASBESTOS-CONTAINING PRODUCTS

During the past 10 years there has developed much new knowledge and, consequently, greatly increased concern regarding the health hazards to workers in the asbestos-producing and consuming industries and to those who install or use asbestos-containing products, that may result from the inhalation of fine asbestos fibers into the lungs. Preventive measures such as increased ventilation, dust suppression and removal from the working area, and the wearing of face mask respirators while fabricating and installing asbestos products such as thermal insulations have substantially reduced this hazard.

The individual crystalline fibrils of chrysolite asbestos are extremely fine, about 1 millionth of an inch in diameter, are easily airborne and thus carried into the lungs and there become permanently embedded in the alvelar regions. Within the human lung tissue, asbestos fibers are virtually indestructible and are not expelled or absorbed. The result in many cases is the lung disease termed "asbestosis," which often develops eventually into lung cancer. Asbestos is is a special type of pheumoconiosis (dust disease of the lung) and has often been confused with silicosis. The effect of the embedded asbestos fibers is to produce pulmonary fibrosis—scarring of the lung tissue—and progressive deterioration of the lung function.

Many organizations are attacking the asbestosis problem, including the U.S. Public Health Service (HEW), Mount Sinai School of Medicine (New York City), London School of Hygiene and Tropical Medicine, American Medical Association, British Medical Research Council, New York Academy of Sciences, American Cancer Society, several State Departments of Health, the International Association of Heat and Frost Insulators and Asbestos Workers, and several manufacturers of asbestos-containing insulation products. In Great Britain, asbestosis has been established as a compensable industrial disease. Very recently, the Environmental Protection Administration of New York City has set restrictive rules for the safe spray application of any asbestos-containing insulation at construction sites, to prevent air pollution by fine asbestos fibers.

Referring to the composition of typical example I of the new perlite insulation, the asbestos fiber content is very small, only 4.4 percent by weight, so that the hazard of fine airborne asbestos fibers being inhaled by insulation workmen is minimal. With the composition of typical example II, which contains no asbestos, this hazard is completely eliminated. The fibers of chopped spun glass roving are of much larger diameter than asbestos fibrils and while they may cause temporary irritation of the respiratory membranes if inhaled, they do not induce a pneumoconiosis nor cause permanent lung damage. The other ingredients of the new perlite insulation—cellular expanded perlite, sodium and potassium silicates, and sodium hexametaphosphate—are likewise noninjurious to the human lung if fine particles of dust from the molded insulation are inhaled.

PREPARATION OF THE PRODUCT

The preparation of the new modified silicate binder solution is quite simple. The quantity of sodium hexametaphosphate to provide the specified proportion in the binder formula is dissolved in water. To this solution is added, with agitation for about 15 minutes, the specified quantity of sodium silicate, as solution. Then the specified quantity of potassium silicate, as solution, is added with further agitation for about 5 minutes. If an organic plasticizer is to be included, as in example I, there is then added to this mixture of soluble silicates and phosphate the specified quantity for a styrene-butadiene polymer latex, with further agitation for another 5 minutes. More water is added to adjust the concentration of the binder solution for spraying, and the binder mixture is agitated for another 10 minutes, and is then ready for use.

In producing typical example I the short asbestos fiber and the expanded perlite were weighed and then thoroughly blended dry. This dry mixture was then sprayed with a measured quantity of the binder solution, separately prepared, containing the specified amounts of sodium silicate, potassium silicate and sodium hexametaphosphate. The styrene-butadiene polymer latex was also included in the binder solution for convenience in application. The moistened mixture of perlite, asbestos and binder was than further agitated and blended to complete the distribution of the binder solution over the surfaces of the perlite particles and fibers. The completed mixture, ready for molding, was a loose, bulky, granular mass that appeared to be slightly damp, but not visibly wet. The moisture content was about 90 percent of the weight of dry solids.

Typical example II was produced in exactly the same way, except that the asbestos fiber was omitted and the chopped spun glass roving was blended dry with the expanded perlite; also, the styrene-butadiene polymer latex was omitted from the binder solution.

In making the molded insulation the water content of the moistened perlite mixture (to be later removed by drying the molded piece) will be in the range of 0.8 to 1.1 times the weight of the dry solids and usually is between 0.9 to 1.0 times the weight of dry solids.

A weighed quantity of the slightly damp mixture was placed in a mold cavity and subjected to light molding pressure, sufficient to compact the loose material into a monolithic molded mass having the exact configuration of the mold cavity, but without expelling any water from the mold. The molded piece was then removed from the mold, dried in an oven at a temperature of about 250° F., and tested. The dried molded insulation showed no shrinkage or warpage and had the exact dimensions of the mold cavity in which it was formed.

GENERAL CONSIDERATIONS

It has been found that particularly good results are obtained when the potassium silicate is at least half (50 percent) of the total soluble silicate in the binder composition. The sodium hexametaphosphate should be at least 20 percent by weight of the total silicates in the composite binder and may range from 20 to 40 percent, but preferably from 20 to 30 percent. To obtain the optimum physical properties of the molded perlite insulation the total amount of the composite silicate-phosphate binder should be at least 20 percent by weight of the insulation composition.

The dry solids content of the combined soluble silicate and phosphate binder materials in the binder solution is usually about 20 percent by weight. The water-dispersed styrene-butadiene polymer latex, if used, is not included in this figure since this material does not function as a binder in the molded perlite insulation product.

Preferably the new molded perlite insulation is produced at a density in the range of 10 to 12 pounds per cubic foot. It can be molded at higher density up to 14 pounds with some sacrifice of thermal insulating efficiency, or as low as 9 pounds with somewhat lower mechanical strength.

THE PREFERRED RANGES

Referring to the composition of the above typical example I of the new perlite insulation, some variation in the proportions of each of the components is permissible. Optimum results are obtained within the following preferred ranges:

| | Preferred composition range, Dry weight Percent | |
|---|---|---|
| | Min. | Max. |
| Expanded perlite, bulk density 2.0 to 2.5 lb./cu. ft. | 65 | 70 |
| Sodium silicate | 8 | 12 |
| Potassium silicate | 8 | 12 |
| Sodium hexametaphosphate | 4 | 5 |
| Short asbestos fiber | 4 | 5 |
| Styrene-butadiene polymer latex | 3 | 4 |

The potassium silicate is preferably at least 40 percent of the total weight of silicates in the binder composition.

It is of course to be understood that within the above percent ranges, if one ingredient is at the minimum or maximum of the range, then the percentages of the other ingredients must be adjusted accordingly to total 100 percent.

Referring to the composition of the above typical example II (containing fine glass fibers instead of asbestos), optimum results are obtained within the following preferred ranges for each of the ingredients.

| | Preferred composition range, Dry weight Percent | |
|---|---|---|
| | Min. | Max |
| Expanded perlite, bulk density 2.0 to 2.5 lb./cu. ft. | 65 | 70 |
| Sodium silicate | 8 | 12 |
| POtassium silicate | 8 | 12 |
| Sodium hexametaphosphate | 4 | 6 |
| Chopped spun glass roving, ¼" to ½" length | 4 | 8 |

THE BROAD RANGES

If it is desired to produce a molded perlite insulation having excellent stress-corrosion-inhibiting properties, but not requiring mechanical strength, water resistance or service temperatures as high as possessed by the insulation of the preferred compositions, this can be accomplished using asbestos-containing compositions within a somewhat broader range, as follows:

| | Broad composition range. Dry weight Percent | |
|---|---|---|
| | Min. | Max. |
| Expanded perlite, bulk density 1.8 to 3.5 lb./cu. ft. | 60 | 75 |
| Sodium silicate | 5 | 14 |
| Potassium silicate | 6 | 15 |
| Sodium hexametaphosphate | 3 | 6 |
| Short asbestos fiber | 0 | 6 |
| Styrene-butadiene polymer latex | 0 | 5 |

A molded perlite insulation having excellent stress-corrosion-inhibiting properties, but with somewhat lower capabilities as to water resistance, mechanical strength and service temperatures than possessed by the insulation products of the preferred compositions, can be made using glass-fiber-reinforced compositions within a broader range, as follows:

| | Broad composition range. Dry weight Percent | |
|---|---|---|
| | Min. | Max. |
| Expanded perlite, bulk density 1.8 to 3.5 lb./cu. ft. | 60 | 75 |
| Sodium silicate | 5 | 15 |
| Potassium silicate | 5 | 15 |
| Sodium hexametaphosphate | 3 | 8 |
| Chopped spun glass roving, ⅛" to 1" length | 0 | 10 |

TEST DATA

When the molded perlite insulation products of the above typical examples I and II were tested, in comparison with the requirements of U.S. Military Specification MIL-I-2781E for Insulating Block, the following physical properties were shown:

| | Typical example | | Requirements of MIL-I-2781E |
|---|---|---|---|
| | 1 | II | |
| Density, lbs./cu. ft. | 11.6 | 11.8 | 14.0 maximum. |
| Flexural strength (transverse modulus): | | | |
| Dry, lbs. per sq. in. | 74.0 | 52.5 | 3 times density. |
| Wet, lbs. per sq. in. | 48.4 | 39.5 | (No requirement.) |
| Effects of soaking heat for 6 hours at 1,200° F.: | | | |
| Loss in weight, percent | 5.9 | 3.0 | 12.0 maximum. |
| Linear shrinkage, percent | 0.87 | 1.1 | 2.0 maximum. |
| Resistance to abrasion (tumble test), weight loss, percent: | | | |
| After 10 minutes | 38.0 | 44.0 | 50 maximum. |
| After 20 minutes | 67.0 | 70.6 | 80 maximum. |
| Water absorption, after 24 hours immersion, percent by weight. | 244 | 265 | (No requirement.) |
| Water absorption, after 3 hours boiling water immersion, percent. | [1] 277 | [1] 336 | Do. |

[1] The test specimen showed no structural deterioration or physical disintegration of the molded insulation in this test.

Thermal conductivity measurements of the insulation product of the above typical example I gave the following values, in B.t.u. per hour per square foot per degree F. per inch of thickness.

| Conductivity at 300° F. mean temp. | 0.46 |
|---|---|
| 500° F. | 0.58 |
| 700° F. | 0.68 |

As would be expected from the fact that the insulation products of example I and example II are closely similar in composition and nearly of the same density, the thermal conductivity values for example II are substantially identical with those of example I, within the normal plus or minus 5 percent reproducibility variation of thermal conductivity measurements on insulation materials for high-temperature service.

The new perlite insulation of the above typical examples was also tested for its corrosion-inducing potential by the test methods of Military Specification MIL-I-24224 (Naval Ships Engineering Command of the Department of Defense) for thermal insulations to be applied on stainless steel. The test results showed that the new perlite insulation is fully inhibited against inducing corrosion and meets all requirements of the above specification, with an ample margin of safety. The test method involves "wicking" (transmigrating) of distilled, deionized water through the insulation specimen in contact with a stressed, heated specimen of austenitic stainless steel for a period of 28 days, to concentrate any soluble salts at the surface of the metal that could thereby induct cracking.

From the above results it is apparent that the new perlite insulation has very low density; high-thermal-insulation efficiency; adequate strength for handling and installation, whether dry or wet; good resistance to abrasion; high resistance to structural disintegration when subjected to boiling water immersion; and has negligible corrosion potential when applied on stainless steel.

Referring to the above "corrosion-potential" test of the insulation, it has been proposed to accelerate this test and also simulate the conditions under which chloride ions from external sources, as well as from the substance of the insulation, concentrate on the surface of the metal. This is done by using as the wicking test solution a positive, corrosion-inducing ion, namely, 1500 p.p.m. of sodium chloride, in the place of deionized water. This test is run for 6 days and determines the extent of any inhibiting effect against stress corrosion afforded by the insulation. When tested in this way, the new perlite insulation showed that it afforded complete protection against corrosion induced by the chloride ion under such conditions.

It will of course be understood that in order to be effective as a corrosion inhibitor the insulation must be installed so that it is actually in contact with the stainless steel. Transmigration of moisture will then supply sufficient soluble silicate and phosphate from the insulation to the metal surface to produce a protective film; but if the configuration of the insulation is such that there are large voids with no contact, as with some fittings, this may not occur.

THEORY OF OPERATION

The results above described were unexpected and not fully understood. Presumably there may be some reaction between the soluble silicates and the surfaces of the perlite particles forming an insoluble or difficulty soluble compound, or depositing a silica film at the interface, during the drying of the molded insulation. Another possible explanation might be the reaction between the metaphosphate and part of the sodium oxide in the silicate solution to form an orthophosphate, thereby increasing the silica/soda ratio and making the film less easily soluble. Regardless of the validity of any such explanations the actual behavior of the molded perlite insulation confirms the superior results of the composite silicate-phosphate binder.

The mechanism of the formation and maintenance of the corrosion-inhibiting protective film on the surface of the stainless steel is believed to be as follows: moisture transmigrating the perlite insulation redissolves or colloidally disperses an extremely small amount of the excess dried silicate-phsosphate binder between the perlite particles and deposits a microscopically thin protective film on the surface of the metal. This film contains the alkaline cations, Sodium, ($Na^+$), Potassium, ($K^+$) and the anions $SiO_3{=}$ and $PO_3{-}$, plus the dispersed silica of the soluble silicates ($SiO_2$). The excess binder maintains a reservoir, and the minute amounts withdrawn do not affect the bond strength of the insulation.

ADDITIONAL PROPERTIES

The new perlite insulation of this invention has quite extraordinary properties in respect to its behavior in the presence of moisture or liquid water. Thus, it is not water-repellent and water is readily absorbed and transmigrated within the molded insulation. Yet even after 24-hours immersion and when fully saturated with water the molded insulation retains almost two-thirds of its original dry flexural strength; even soaking wet the flexural strength still exceeds the requirements of MIL-I-2781E. Even more remarkable is its behavior when immersed in boiling water. Thus, after more than 100 hours of such immersion, the test specimen was still intact, showed no evidence of structural disintegration, and after drying to remove the absorbed water, was capable of giving satisfactory service as thermal insulation. Although all the ingredients of the composite silicate-phosphate binder solution were water soluble when applied to the perlite before molding, the binder after drying has become highly water-resistant and retains a strong and persistent bond between the perlite particles under severe water exposure.

From the viewpoint of the effectiveness of the new perlite insulation, is exerting a positive corrosion-inhibiting effect on stainless steel, the fact that it readily absorbs and transmigrates moisture is considered advantageous. This ensures that when excessive moisture is present, as from spillage of water on the outer surface of the insulation or from steam leaks, the transmigration of moisture through the insulation will dissolve a sufficient amount of the excess soluble silicate and phosphate of the binder content, and transmit it to the metal surface to form the protective silicate-phosphate film thereon that will inhibit the corrosive effects of any chloride ion concentration.

The invention having now been described in detail, and the ranges of composition within which the improved corrosion-inhibiting thermal insulation may be made having also been set forth, the limitations intended are only those set forth in the following claims.

The embodiments of the invention in which an exclusive property or privilege is claimed are defined as follows:

1. A molded thermal insulation consisting of at least 60 to about 75 percent by weight of finely divided, cellular expanded perlite having a bulk density in the range of about 1.8 to about 3.5 lb./cu. ft., bonded into a monolithic mass by a dried, inorganic, water-soluble binder consisting of a major proportion of a mixture of sodium silicate and potassium silicate and a lesser proportion of sodium hexametaphosphate, said sodium hexametaphosphate being from about 20 to about 40 percent by weight of the total silicates in said binder composition, said soluble silicates each having a molecular ratio of silica to alkaline oxide of at least 3.6 to 1.0, said potassium silicate being at least 40 percent by dry weight of the total silicate in the dried binder, said composite binder being at least about 20 percent by weight of he total insulation composition, said dried composite binder constituting a reservoir of stress-corrosion-inhibiting compounds for an austenitic stainless steel surface on which said insulation is installed, whereby moisture transmigrated through said insulation to said steel surface deposits thereon a film containing $K^+$ and $Na^+$ cations, $SiO_3{=}$ and $PO_3{-}$ anions and dispersed silica, $SiO_2$, which is effective to inhibit stress-corrosion cracking of said stainless steel.

2. A stress-corosion-inhibiting molded thermal insulation for austenitic stainless steel, consisting of from about 60 to about 75 percent by weight of cellular expanded perlite having a bulk density in the range of about 1.8 to about 3.5 lb./cu. ft., from about 5 to about 14 percent of sodium silicate having a molecular ratio of silica to sodium oxide of at least 3.6 to 1.0, from about 6 to about 15 percent of potassium silicate having a molecular ratio of silica to potassium oxide of at least 3.6 to 1.0, from about 3 to about 6 percent of sodium hexametaphosphate, from about 3 to about 6 percent, by weight of short asbestos fiber having a gradation conforming to Group 7 of the Canadian Standard Fiber Classification (Q.A.M.A.), and up to 5 percent of a styrene-butadiene polymer latex as a plasticizer, said mixture of silicates and sodium hexametaphosphate constituting a composite binder for said expanded perlite to bond the particles and fibers into a monolithic molded mass, said thermal insulating material showing no significant change from mold dimensions, having low density and high-thermal-insulating efficiency in the temperature range from about 100° F. up to about 1,300° F., having high flexural strength both dry and wet, and being highly resistant to structural deterioration by boiling water.

3. A stress-corrosion-inhibiting molded thermal insulation for austenitic stainless steel, consisting of from about 65 to about 70 percent by weight of cellular expanded perlite having a bulk density in the range of about 2.0 to 2.5 lb./cu. ft., from about 8 to about 12 percent of sodium silicate having a molecular ratio of silica to sodium oxide of at least 3.6 to 1.0, from about 8 to about 12 percent of potassium silicate having a molecular ratio of silica to potassium oxide of at least 3.6 to 1.0, from about 4 to about 5 percent of sodium hexametaphosphate, from about 4 to about 5 percent of short asbestos fiber having a gradation conforming to Group 7 of the Canadian Standard Fiber Classification (Q.A.M.A.), and from about 3 to about 4 percent of a styrene-butadiene polymer latex as a plasticizer, said mixture of silicates and sodium hexametaphosphate being at least about 20 percent by weight of the total composition and constituting a composite binder for said expanded perlite to bond the particles and fibers into a monolithic molded mass, said thermal insulating material showing no significant change from mold dimensions, having a density in the range of 10 to 12 lb./cu. ft. and high-thermal-insulation efficiency in the temperature range from about 100° F. up to about 1,300° F., having high flexural strength both dry and wet, and being highly resistant to structural deterioration by boiling water.

4. A stress-corrosion-inhibiting molded thermal insulation for austenitic stainless steel consisting of about 67.8 percent by weight of finely divided, cellular, expanded perlite having a bulk density in the range of about 2.0 to 2.5 pounds per cubic foot, about 10.3 percent of sodium silicate binder having a silica/soda weight ratio of about 3.75 to 1.0, about 10.3 percent of potassium silicate binder having a silica/potash weight ratio of about 2.50 to 1.0, about 4.1 percent of sodium hexametaphosphate, about 4.4 percent of 7W Grade short amosite asbestos fiber, equivalent in gradation to Group 7 of the Candian Standard Fiber Classification (Q.A.M.A), and about 3,1 percent of a styrene-butadiene polymer latex as a plasticizer, said composition being bonded into a monolithic mass, said thermal insulation showing no significant change from mold dimensions, having a density of about 11.6 pounds per cubic foot, having high-thermal-insulating efficiency in the temperature range from about 100° F. up to about 1,300° F., having high flexural strength, both dry and wet, and being highly resistant to structural deterioration by boiling water.

5. A binder composition for a pressure-molded mass of finely divided, cellular, expanded perlite thermal insulating material, consisting of a major proportion of a mixture of sodium silicate and potassium silicate in water solution, and a lesser proportion of sodium hexametaphosphate dissolved in said silicate solution, said sodium hexametaphosphate being about 20 to about 40 percent by weight of the total silicates in said binder composition, said soluble silicates each having a molecular ratio of silica to alkaline oxide of at least 3.6 to 1.0, said potassium silicate being at least 40 percent by dry weight of the total silicate in the dried binder, said binder solution being of free flowing consistency and readily sprayable for application to said expanded perlite, and said binder composition being a corrosion inhibitor for austenitic stainless steel surfaces on which the perlite insulation bonded therewith is installed.

6. A binder composition for a pressure-molded mass of finely divided, cellular, expanded perlite thermal insulating material, consisting of a water solution of a mixture of sodium and potassium silicates, said silicates each having a molecular ratio of silica to alkaline oxide of at least 3.6 to 1.0, and sodium hexametaphosphate dissolved in said mixed silicate solution, said potassium silicate being in the range of about 40 to about 60 percent of the total weight of soluble silicates in the binder composition, said sodium hexametaphosphate being in a smaller proportion than the soluble silicates, in the range of about 20 to 30 percent of the total weight of said silicates, said binder solution containing about 20 percent by weight of dissolved solids, said binder solution being of free flowing consistency and readily sprayable for application to said expanded perlite, and said binder composition being a corrosion inhibitor for austenitic stainless steel surfaces on which the perlite insulation bonded therewith is installed.

7. A binder composition for A pressure-molded mass of finely divided, cellular, expanded perlite thermal insulating material, consisting of a water solution of a mixture containing equal amounts by weight of sodium and potassium silicates, said sodium silicate having a silica/soda weight ratio of about 3.75 to 1.0, said potassium silicate having a silica/potash weight ratio of about 2.50 to 1.0, and sodium hexametaphosphate dissolved in said mixed silicate solution in a minor proportion of about 20 percent of the total dry weight of said silicates, said binder solution containing about 20 percent by weight of dissolved solids, said binder solution being of free flowing consistency and readily sprayable for application to said expanded perlite, and said binder composition being a corrosion inhibitor for austenitic stainless steel surfaces on which the perlite insulation bonded therewith is installed.

8. A molded thermal insulation according to claim 1, containing as mechanical reinforcement for the monolithic mass of expanded perlite and binder a minor proportion of a heat-resistant, inorganic fiber, selected from the class consisting of short asbestos fiber and chopped spun glass fiber roving.

9. A molded thermal insulation according to claim 8, in which said heat-resistant inorganic fiber consists of up to 6 percent by weight of short asbestos fiber having a gradation conforming to Group 7 of the Canadian Standard Fiber Classification (Q.A.M.A).

10. A molded thermal insulation according to claim 8, in which said heat-resistant inorganic fiber consists of up to 10 percent by weight of chopped spun glass roving of from one-eighth inch to 1 inch length.

11. A stress-corrosion-inhibiting molded thermal insulation for austenitic stainless steel, consisting of from about 60 to about 75 percent by weight of cellular expanded perlite having a bulk density in the range of about 1.8 to about 3.5 lb./cu. ft., from about 5 to about 15 percent by dry weight of sodium silicate having a molecular ratio of silica to sodium oxide of at least 3.6 to 1.0, from about 5 to about 15 percent by dry weight of potassium silicate having a molecular ratio of silica to potassium oxide of at least 3.6 to 1.0, from about 3 to about 8 percent of sodium hexametaphosphate, and up to 10 percent of chopped spun glass roving of ⅛-inch to 1-inch length as a heat-resistant, inorganic fibrous reinforcement, said mixture of silicates and sodium hexametaphosphate constituting a composite binder for said expanded perlite to bond the particles and fibers into a monolithic molded mass, said molded thermal insulation showing no significant change from mold dimension, having low density and high-thermal-insulating efficiency in the temperature range from about 100° F. up to about 1,300° F., having high flexural strength both dry and wet, and being highly resistant to structural deterioration by boiling water.

12. A stress-corrosion-inhibiting molded thermal insulation for austenitic stainless steel, consisting of from about 65 to about 70 percent by weight of cellular expanded perlite, having a bulk density in the range of about 2.0 to 2.5 lb./cu. ft., from about 8 to about 12 percent of sodium silicate having a molecular ratio of silica to sodium oxide of at least 3.6 to 1.0, from about 8 to about 12 percent of potassium silicate having a molecular ratio of silica to potassium oxide of at least 3.6 to 1.0, from about 4 to about 6 percent of sodium hexametaphosphate, and from about 4 to about 8 percent of chopped spun glass roving of ¼-inch to ½-inch length as a heat-resistant, inorganic fibrous reinforcement, said mixture of silicates and sodium hexametaphosphate being at least about 20 percent by weight of the total composition and constituting a composite binder for said expanded perlite to bond the particles and fibers into a monolithic molded mass, said molded thermal insulation showing no significant change from mold dimensions, having a density in the range of 10 to 12 lb./cu. ft. and high thermal insulating efficiency in the temperature range from about 100° F. up to about 1,300° F., having high flexural strength both dry and wet, and being highly resistant to structural deterioration by boiling water.

13. A stress-corrosion-inhibiting molded thermal insulation for austenitic stainless steel consisting of about 67.5 percent by weight of finely divided, cellular, expanded perlite having a bulk density in the range of about 2.0 to 2.5 pounds per cubic foot, about 11.0 percent of sodium silicate binder having a silica/soda weight ratio of about 3.75 to 1.0, about 11.0 percent of potassium silicate binder having a silica/potash weight ratio of about 2.50 to 1.0, about 4.5 percent of sodium hexametaphosphate, about 4.0 percent of chopped spun glass roving of ½-inch length and about 2.0 percent of chopped spun glass roving of ¼-inch length as heat-resistant, inorganic fibrous reinforcement, said composition being bonded into a monolithic mass by said composite silicate binder, said molded thermal insulation showing no significant change from mold dimensions, having a density of about 11.8 pounds per cubic foot, having high thermal insulating efficiency in the temperature range from about 100° F. up to about 1,300° F., having high flexural strength both dry and wet, and being highly resistant to structural deterioration by boiling water.

* * * * *